(12) United States Patent
Terada (10) Patent No.: US 11,958,489 B2
(45) Date of Patent: Apr. 16, 2024

(54) TIRE FORCE ESTIMATOR, FOUR-WHEELED VEHICLE, AND TIRE FORCE ESTIMATION METHOD

(71) Applicant: KAWASAKI MOTORS, LTD., Akashi (JP)

(72) Inventor: Takenori Terada, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 524 days.

(21) Appl. No.: 17/203,486

(22) Filed: Mar. 16, 2021

(65) Prior Publication Data

US 2022/0297703 A1   Sep. 22, 2022

(51) Int. Cl.
*B60W 40/13* (2012.01)
*B60W 50/00* (2006.01)

(52) U.S. Cl.
CPC ........... *B60W 40/13* (2013.01); *B60W 50/00* (2013.01); *B60W 2040/133* (2013.01); *B60W 2040/1338* (2013.01); *B60W 2050/0028* (2013.01); *B60W 2050/0056* (2013.01); *B60W 2520/105* (2013.01); *B60W 2520/125* (2013.01); *B60W 2520/16* (2013.01); *B60W 2520/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,340,368 B2* | 3/2008 | Fiedler | ................ | G01G 19/086 |
| | | | | 702/145 |
| 2004/0050151 A1* | 3/2004 | Kojima | ................... | B60C 23/20 |
| | | | | 73/146 |
| 2017/0282971 A1* | 10/2017 | Yanez | ................... | B62D 5/001 |
| 2020/0207361 A1* | 7/2020 | Ishigami | ............... | B60W 50/00 |

* cited by examiner

*Primary Examiner* — Manuel L Barbee
(74) *Attorney, Agent, or Firm* — Alleman Hall & Tuttle LLP (57) ABSTRACT

A tire force estimator includes a measuring unit configured to measure an acceleration of a vehicle body of a four-wheeled vehicle in a horizontal direction and an acceleration of at least one of four wheels of the four-wheeled vehicle in a vertical direction; and a processing unit configured to estimate a tire force acting on the at least one wheel from a ground surface in the vertical direction based on the acceleration of the vehicle body in the horizontal direction and the acceleration of the at least one wheel in the vertical direction.

17 Claims, 8 Drawing Sheets

AT REST

TIRE FORCE ESTIMATOR, FOUR-WHEELED VEHICLE, AND TIRE FORCE ESTIMATION METHOD

BACKGROUND

Technical Field

Aspects of the present disclosure relate to a tire force estimator configured to estimate a tire force acting on a tire of a four-wheeled vehicle from a ground surface, a four-wheeled vehicle including the tire force estimator, and a tire force estimation method for estimating a tire force acting on a four-wheeled vehicle.

Description of the Related Art

U.S. Pat. No. 7,340,368 discloses a method for estimating a tire force. This tire force estimation method uses a measuring device disposed at the center of gravity of the vehicle body to measure at least two accelerations in two orthogonal directions and three angular velocities about three orthogonal axes of the vehicle body. The tire force is estimated using these measured values.

SUMMARY

A tire force estimator according to an aspect of the present disclosure includes: a measuring unit configured to measure an acceleration of a vehicle body of a four-wheeled vehicle in a horizontal direction and an acceleration of at least one of four wheels of the four-wheeled vehicle in a vertical direction; and a processing unit configured to estimate a tire force acting on the at least one wheel from a ground surface in the vertical direction based on the acceleration of the vehicle body in the horizontal direction and the acceleration of the at least one wheel in the vertical direction.

In the above configuration, the tire force acting on the wheel from the ground surface in the vertical direction is estimated using in combination the acceleration of the wheel in the vertical direction and the acceleration of the vehicle body in the horizontal direction. That is, the acceleration of the wheel in the vertical direction is taken into account to estimate the tire force acting in the vertical direction. As such, the tire force acting in the vertical direction can be estimated more accurately than in conventional tire force estimation which takes no account of the acceleration of the wheel in the vertical direction.

A four-wheeled vehicle according to an aspect of the present disclosure includes: a wheel; a vehicle body supported by the wheel; a suspension structure connecting the wheel to the vehicle body; and a tire force estimator configured to estimate a tire force acting on the wheel from a ground surface in a vertical direction, the tire force estimator including: a measuring unit configured to measure an acceleration of the vehicle body in a horizontal direction and an acceleration of the wheel in the vertical direction; and a processing unit configured to estimate the tire force acting on the wheel from the ground surface in the vertical direction based on the acceleration of the vehicle body in the horizontal direction and the acceleration of the wheel in the vertical direction.

In the above configuration, the tire force acting on the wheel from the ground surface in the vertical direction is estimated using in combination the acceleration of the wheel in the vertical direction and the acceleration of the vehicle body in the horizontal direction. That is, the acceleration of the wheel in the vertical direction is taken into account to estimate the tire force acting in the vertical direction. As such, the tire force acting in the vertical direction can be estimated more accurately than in conventional tire force estimation which takes no account of the acceleration of the wheel in the vertical direction.

A tire force estimation method according to an aspect of the present disclosure includes: measuring an acceleration of a vehicle body of a four-wheeled vehicle in a horizontal direction and an acceleration of a wheel of the four-wheeled vehicle in a vertical direction; and estimating a tire force acting on the wheel from a ground surface in the vertical direction based on the acceleration of the vehicle body in the horizontal direction and the acceleration of the wheel in the vertical direction.

In the above method, the tire force acting on the wheel from the ground surface in the vertical direction is estimated using in combination the acceleration of the wheel in the vertical direction and the acceleration of the vehicle body in the horizontal direction. That is, the acceleration of the wheel in the vertical direction is taken into account to estimate the tire force acting in the vertical direction. As such, the tire force acting in the vertical direction can be estimated more accurately than in conventional tire force estimation which takes no account of the acceleration of the wheel in the vertical direction.

The above and further objects, features and advantages of the present disclosure will be more apparent from the following detailed description of exemplary embodiments with reference to the accompanying drawings.

DETAILED DESCRIPTION OF THE EMBODIMENTS

Hereinafter, exemplary embodiments will be described with reference to the drawings.

Four-Wheeled Vehicle

Figure 1:
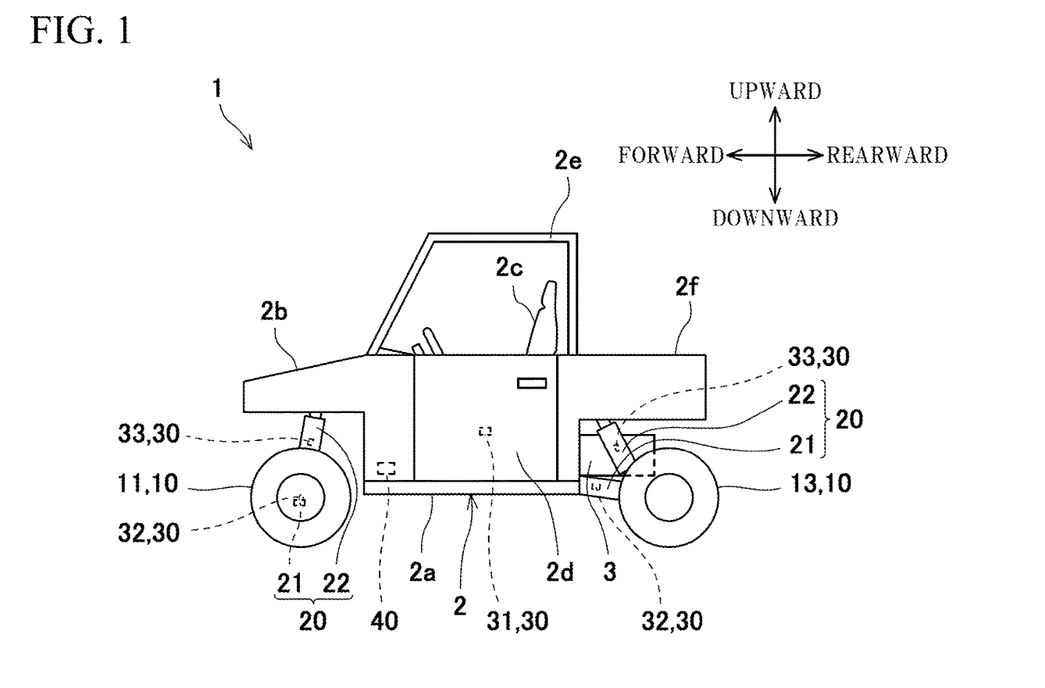
FIG. 1 is a schematic left side view of a four-wheeled vehicle according to an exemplary embodiment.

FIG. 1 is a schematic left side view of a four-wheeled vehicle 1 according to an exemplary embodiment. In the present embodiment, a rough terrain vehicle such as a utility vehicle is illustrated as an example of the four-wheeled vehicle 1. In the following description, the four-wheeled vehicle 1 may be simply referred to as the "vehicle 1". As shown in FIG. 1, the vehicle 1 includes a vehicle body 2, four wheels 10 supporting the vehicle body 2, and a drive power generator 3 that generates drive power for travel of the vehicle 1.

The vehicle body 2 includes a base frame 2a including a pipe frame made up of a plurality of pipes connected together. The vehicle body 2 further includes a hood 2b, a pair of occupant seats 2c, a pair of doors 2d, a cabin frame 2e, and a cargo carrier 2f, which are supported by the base frame 2a. The hood 2b is made of resin and covers the space between left and right front wheels 11 and 12 from above. The occupant seats 2c are located behind the hood 2b and arranged side-by-side. The two doors 2d are located outward, respectively, of the two occupant seats 2c in a lateral direction. The cabin frame 2e is constructed to surround a cab (occupant compartment) in which the occupant seats 2c are disposed. The cargo carrier 2f is located behind the occupant seats 2c. The cargo carrier (cargo bed) 2f defines a recessed cargo-carrying space to accommodate cargoes.

The drive power generator 3 is a drive source for travel of the vehicle 1. The drive power generator 3 is, for example, an internal combustion engine. The drive power generator 3 is supported by the base frame 2a. The intake and exhaust ports of the engine serving as the drive power generator 3 are located above the upper ends of the wheels 10. The drive power generator 3 may be a drive source other than the engine and may be, for example, an electric motor.

Figure 3:
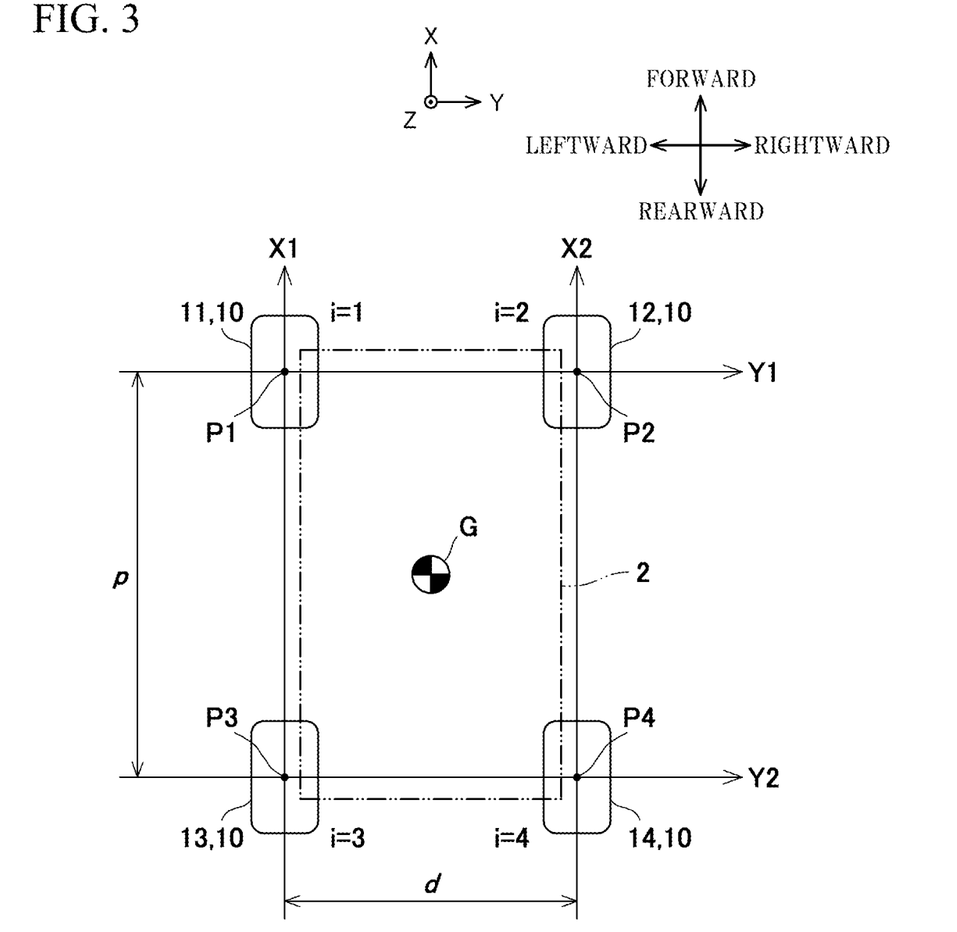
FIG. 3 is a schematic plan view of the four-wheeled vehicle for illustrating imaginary axes.

The four wheels 10 include left and right front wheels 11 and 12 (see FIG. 3) and left and right rear wheels 13 and 14 (see FIG. 3). In the following description, the left front wheel 11, right front wheel 12, left rear wheel 13, and right rear wheel 14 will be referred to as "wheel(s) 10" where the wheels 11, 12, 13, and 14 are not distinguished from one another. The wheel 10 is an assembly including a wheel and a tire mounted on the outer circumference of the wheel to be in contact with the ground surface. The left and right front wheels 11 and 12 support the front of the vehicle body 2, and the left and right rear wheels 13 and 14 support the rear of the vehicle body 2.

The vehicle 1 of the present embodiment is a two-wheel-drive vehicle. The left and right rear wheels 13 and 14 are the drive wheels, and the left and right front wheels 11 and 12 are the driven and steered wheels. The torque produced by the drive power generator 3 is transmitted to the left and right rear wheels 13 and 14 serving as the drive wheels. The vehicle 1 includes front wheel brakes for braking of the left and right front wheels 11 and 12 and rear wheel brakes for braking of the left and right rear wheels 13 and 14. Both the front and rear wheel brakes are hydraulic brakes, and each brake applies a braking force to a corresponding one of the wheels 10. The braking force is substantially proportional to a brake pressure.

The vehicle body 2 is supported by the four wheels 10, with four suspension structures 20 interposed between the vehicle body 2 and the wheels 10. The four suspension structures 20 respectively connect the four wheels 10 to the vehicle body 2. Each suspension structure 20 includes a link 21 and a shock absorber 22.

The link 21 is located below the shock absorber 22 and connects a corresponding one of the wheels 10 to the vehicle body 2 in such a manner that the wheel 10 is rockable relative to the vehicle body 2. Specifically, each link 21 includes: an arm connecting the wheel 10 to the vehicle body 2 in such a manner that the wheel 10 is upwardly and downwardly movable relative to the vehicle body 2; and a knuckle rotatably supporting the wheel hub of the wheel 10. For example, each of the links 21 connecting the front wheels 11 and 12 to the vehicle body 2 in an upwardly and downwardly movable manner includes an upper A-arm and a lower A-arm both of which are A-shaped in plan view. For example, each of the links 21 connecting the rear wheels 13 and 14 to the vehicle body 2 in an upwardly and downwardly movable manner includes a trailing arm extending in a longitudinal direction. Each link 21 may be configured to include an arm different from the A-arms and the trailing arm.

The shock absorber 22 has spring properties and damper properties and mitigates shock applied to a corresponding one of the wheels 10. For example, the shock absorber 22 may be adjustable to vary the extension-compression stroke and/or the damping coefficient. The shock absorber 22 connects the corresponding link 21 to the base frame 2a of the vehicle body 2. The link 21 and the shock absorber 22 rock together in conjunction with up-and-down motion of the wheel 10 subjected to a force applied from the ground surface.

A component of the link 21 is defined as an "under-shock absorber element" rockable together with the shock absorber 22. That is, the under-shock absorber element can be an arm (such as an A-arm or a trailing arm) connecting the wheel 10 to the vehicle body 2 in an upwardly and downwardly movable manner or a knuckle rotatably supporting the wheel hub of the wheel 10. The "under-shock absorber element" refers to what may be called an "under-spring component".

Tire Force Estimator

Figure 2:
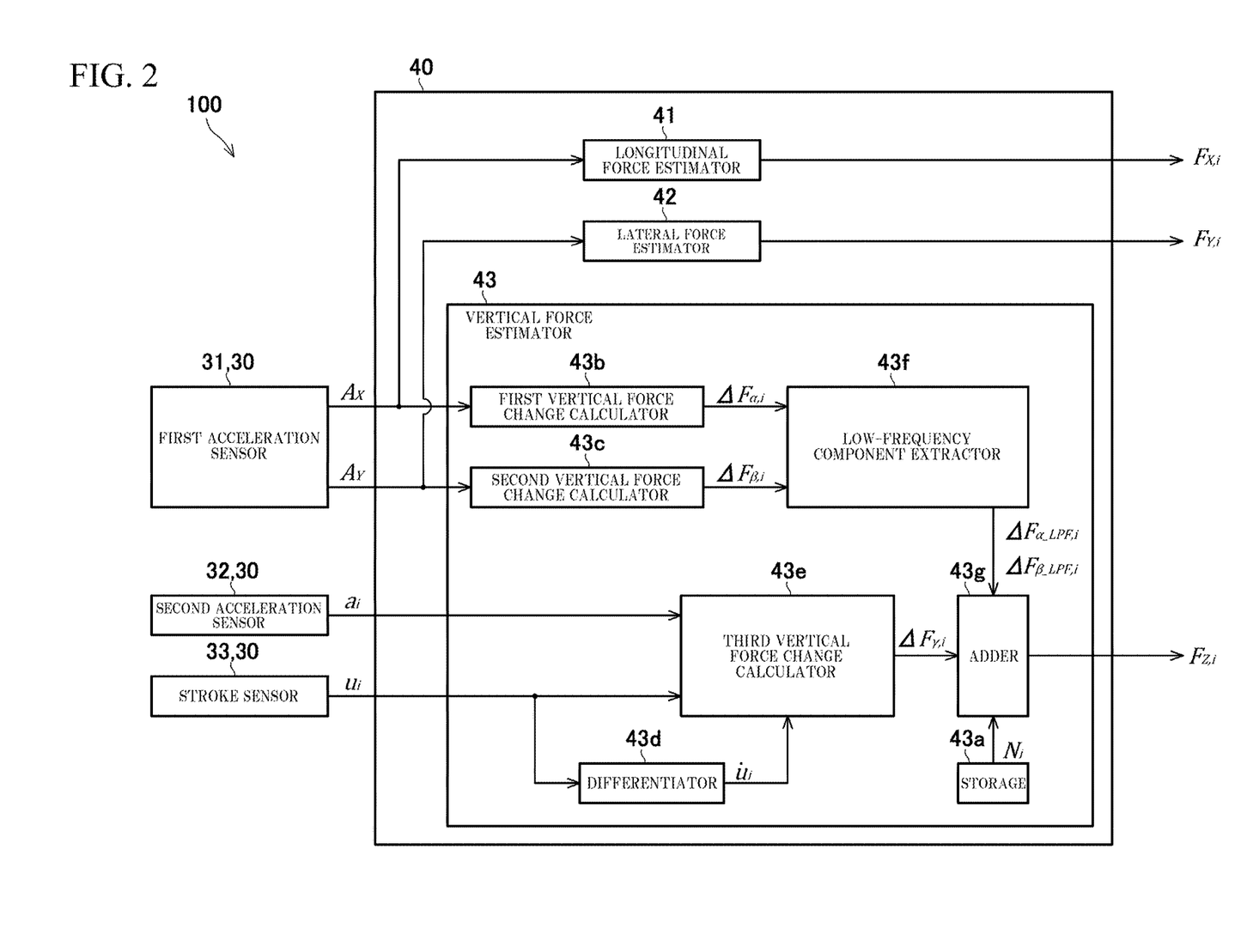
FIG. 2 is a block diagram illustrating the configuration of a tire force estimator of the four-wheeled vehicle of FIG. 1.

In the present embodiment, the vehicle 1 is equipped with a tire force estimator 100. FIG. 2 is a block diagram illustrating the configuration of the tire force estimator 100. The tire force estimator 100 estimates "tire forces" which are forces acting on the wheels 10 of the vehicle 1 from the ground surface.

Figure 4:
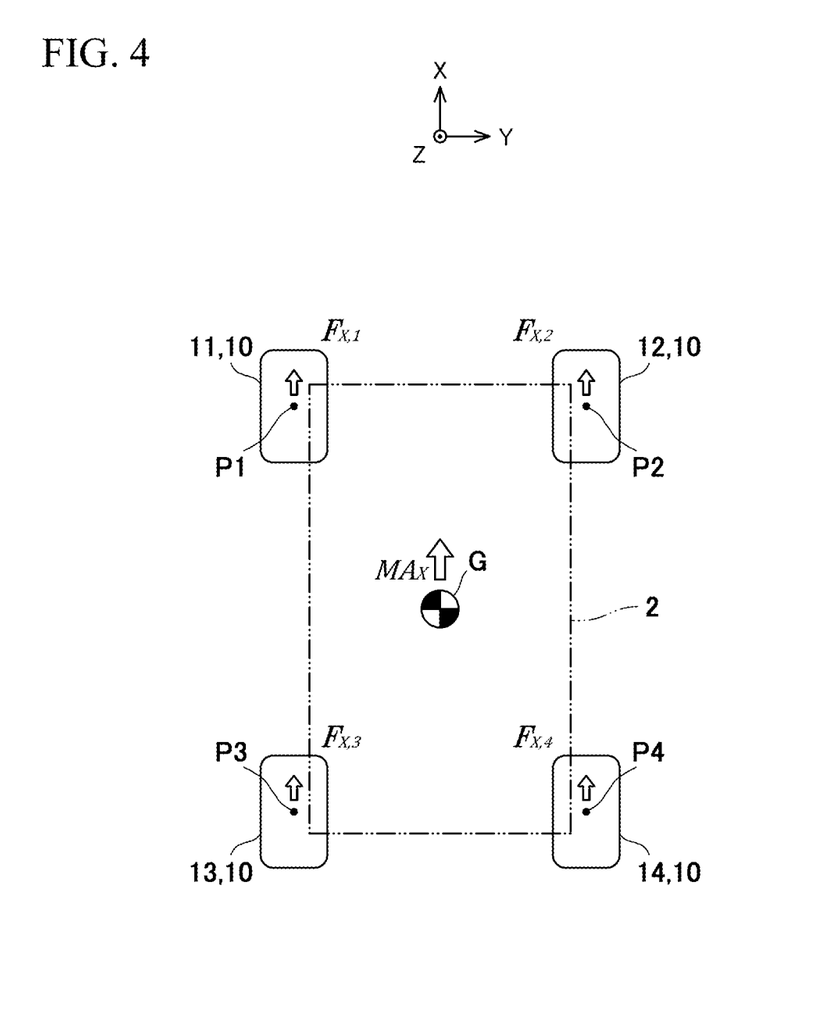
FIG. 4 is a schematic plan view of the four-wheeled vehicle for illustrating the concept of longitudinal force estimation.
Figure 5:
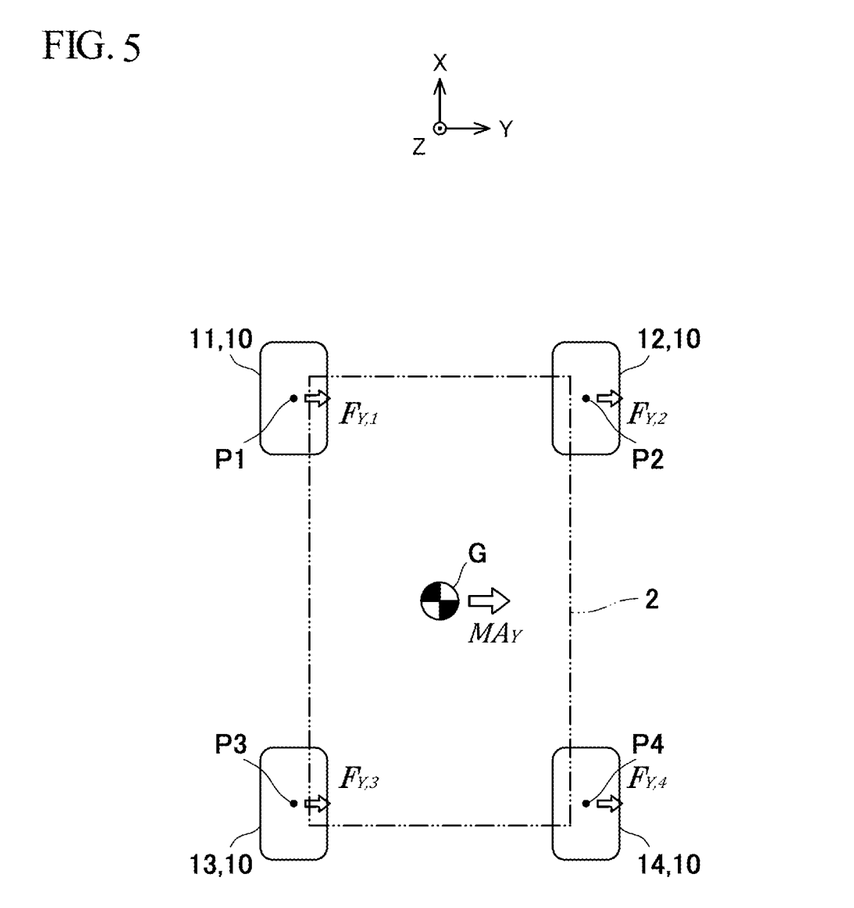
FIG. 5 is a schematic plan view of the four-wheeled vehicle for illustrating lateral force estimation.

The following description is given based on specific definitions of directions and using specific symbols, variables, and notation system. The definitions of directions, the symbols, the variables, and the notation system will first be described with reference to FIG. 3 before the configuration of the tire force estimator 100 and the tire force estimation method. FIG. 3 is a schematic plan view of the four-wheeled vehicle 1. In FIG. 3 and FIGS. 4 and 5 referred to later, the vehicle body 2 is indicated by a dashed-double dotted line for ease of understanding of the figures.

The terms "longitudinal direction" (used interchangeably with "forward-rearward direction"), "lateral direction" (used interchangeably with "leftward-rightward direction"), and "vertical direction" (used interchangeably with "upward-downward direction") refer to directions defined with respect to the vehicle body 2. In the present embodiment, the slope and cant of the ground surface are not taken into account. As shown in FIG. 3, the forward direction of the vehicle body 2 is defined as an X direction, the rightward direction of the vehicle body 2 is defined as a Y direction, and the upward direction of the vehicle body 2 is defined as a Z axis. The X, Y, and Z directions are orthogonal to one another. The X, Y, and Z directions are positive directions for the various variables used in the following description.

Imaginary axes are defined as follows for the vehicle 1 which is traveling straight: an imaginary axis extending in the X direction and passing through the respective ground contact points P1 and P3 of the left front and rear wheels 11 and 13 is defined as an "X1 axis"; an imaginary axis extending in the X direction and passing through the respective ground contact points P2 and P4 of the right front and rear wheels 12 and 14 is defined as an "X2 axis"; an imaginary axis extending in the Y direction and passing through the respective ground contact points P1 and P2 of the left and right front wheels 11 and 12 is defined as a "Y1 axis"; and an imaginary axis extending in the Y direction and passing through the respective ground contact points P3 and P4 of the left and right rear wheels 13 and 14 is defined as a "Y2 axis".

The tire forces include a "longitudinal force $F_X$" acting on the wheel 10 from the ground surface in the longitudinal direction, a "lateral force $F_Y$" acting on the wheel 10 from the ground surface in the lateral direction, and a "vertical force $F_Z$" acting on the wheel 10 from the ground surface in the vertically upward direction.

The tire force estimator 100 estimates the tire forces for each wheel 10. As shown in FIG. 3, the left front wheel 11, right front wheel 12, left rear wheel 13, and right rear wheel 14 are assigned the numbers 1, 2, 3, and 4, respectively. Where the tire forces acting respectively on the four wheels 10 are not distinguished from one another, the longitudinal, lateral, and vertical forces are denoted using a suffix letter "i"; namely, these forces are denoted by $F_{X,i}$, $F_{Y,i}$, and $F_{Z,i}$. Where the tire forces acting on the different wheels 10 are distinguished from one another, the numbers assigned to the wheels 10 are added as suffixes to the reference signs $F_X$, $F_Y$, and $F_Z$. For example, the longitudinal, lateral, and vertical forces acting on the left front wheel 11 are denoted by $F_{X,1}$, $F_{Y,1}$, and $F_{Z,1}$.

The tire force estimator 100 includes a measuring unit 30 configured to measure physical quantities representing the behavior of the vehicle 1 or a part of the vehicle 1 and a processing unit 40 configured to execute processing for estimation of the tire forces based on measurements obtained by the measuring unit 30.

Measuring Unit

The measuring unit 30 of the tire force estimator 100 includes a first acceleration sensor 31, four second acceleration sensors 32, and four stroke sensors 33. It should be noted that in FIG. 2 only one second acceleration sensor 32 and only one stroke sensor 33 are shown for simplicity of the figure.

The first acceleration sensor 31 measures accelerations of the vehicle body 2 in horizontal directions. Specifically, the first acceleration sensor 31 measures at least an acceleration $A_X$ of the vehicle body 2 in the longitudinal direction and an acceleration $A_Y$ of the vehicle body 2 in the lateral direction as the accelerations of the vehicle body 2 in the horizontal directions. For example, the first acceleration sensor 31 is an inertial measurement unit (IMU). The first acceleration sensor 31 is mounted on the vehicle body 2. For example, the first acceleration sensor 31 is disposed at or in the vicinity of the center of gravity G of the vehicle body 2.

The four second acceleration sensors 32 measure the respective accelerations of the four wheels 10 in the vertical direction. Specifically, the four second acceleration sensors 32 measure an acceleration $a_1$ of the left front wheel 11 in the vertical direction, an acceleration az of the right front wheel 12 in the vertical direction, an acceleration $a_3$ of the left rear wheel 13 in the vertical direction, and an acceleration $a_4$ of the right rear wheel 14 in the vertical direction, respectively. The four second acceleration sensors 32 are mounted on the four links 21 (under-shock absorber elements), respectively. Alternatively, the four second acceleration sensors 32 may be mounted on the four wheels 10, respectively. Where the accelerations of the four wheels 10 in the vertical direction are not distinguished from one another, the accelerations are denoted using a suffix letter "i"; namely they are designated as the "acceleration(s) $a_i$".

The four stroke sensors 33 are mounted on the four shock absorbers 22, respectively, and measure the respective stroke amounts of the four shock absorbers 22. To be specific, the four stroke sensors 33 measure a stroke amount $u_1$ of the shock absorber 22 for mitigation of shock applied to the left front wheel 11, a stroke amount $u_2$ of the shock absorber 22 for mitigation of shock applied to the right front wheel 12, a stroke amount $u_3$ of the shock absorber 22 for mitigation of shock applied to the left rear wheel 13, and a stroke amount $u_4$ of the shock absorber 22 for mitigation of shock applied to the right rear wheel 14, respectively. Where the stroke amounts measured by the four stroke sensors 33 are not distinguished from one another, the stroke amounts are denoted using a suffix letter "i"; namely, they are designated as the "stroke amount(s) $u_i$". The symbol dot (•) in the Newton's notation may be placed to the right of an alphabetical letter denoting a variable. For example, the first-order time derivative value of the stroke amount $u_i$ is denoted by "$u_i$•".

The measurements obtained by the measuring unit 30 are sent to the processing unit 40. The processing unit 40 receives at least the acceleration $A_X$ of the vehicle body 2 in the longitudinal direction, the acceleration $A_Y$ of the vehicle body 2 in the lateral direction, the accelerations $a_1$, $a_2$, $a_3$, and $a_4$ of the four wheels 10 in the vertical direction, and the stroke amounts $u_1$, $u_2$, $u_3$, and $u_4$ of the four shock absorbers 22.

Processing Unit

The processing unit 40 includes a processor, a volatile memory, a non-volatile memory, a digital circuit, an analog circuit, a communication circuit, and an I/O interface as hardware elements. The processing unit 40 includes a longitudinal force estimator 41, a lateral force estimator 42, and a vertical force estimator 43 as functional elements. The vertical force estimator 43 includes a storage 43a, a first vertical force change calculator 43b, a second vertical force change calculator 43c, a differentiator 43d, a third vertical force change calculator 43e, a low-frequency component extractor 43f, and an adder 43g. These functional elements can be implemented, for example, by the memories, the processor executing various programs stored in the memories, and various hardware circuits.

Estimation of Longitudinal Force

The way of estimating the longitudinal forces $F_{X,i}$ will be described with reference to FIG. 4. FIG. 4 is a schematic plan view of the four-wheeled vehicle 1 for illustrating the concept of the longitudinal force estimation. The longitudinal force estimator 41 estimates the longitudinal forces $F_{X,i}$ which are tire forces acting on the wheels 10 from the ground surface in the longitudinal direction. The longitudinal force estimator 41 performs this estimation based on the acceleration $A_X$ of the vehicle body 2 in the longitudinal direction. The longitudinal force estimation of the present embodiment is based on the assumption that the acceleration $A_X$ of the vehicle body 2 in the longitudinal direction is generated by the sum of the longitudinal forces $F_{X,i}$ acting on the four wheels 10 from the ground surface in the longitudinal direction. In this case, a motion equation describing the motion of the vehicle body 2 in the longitudinal direction is given as Equation (1) below.

$$MA_X = F_{X,1} + F_{X,2} + F_{X,3} + F_{X,4} \tag{1}$$

In this and subsequent equations, M represents the weight of the vehicle body 2.

The longitudinal force estimation of the present embodiment is further based on the assumption that any longitudinal forces do not act on the left and right front wheels 11 and 12 which are the driven wheels when the vehicle 1 is accelerating, namely when the acceleration $A_X$ is positive. That is, the relationship $F_{X,1}=F_{X,2}=0$ is assumed during acceleration of the vehicle 1. It is further assumed that the longitudinal forces are evenly applied to the left and right rear wheels 13 and 14 which are the drive wheels. That is, the relationship $F_{X,3}=F_{X,4}$ is assumed. Based on these relationships and Equation (1), the longitudinal forces $F_{X,1}$, $F_{X,2}$, $F_{X,3}$, and $F_{X,4}$ during acceleration of the vehicle 1 are expressed by Equation (2) below.

$$F_{X,1}=F_{X,2}=0, F_{X,3}=F_{X,4}=\tfrac{1}{2}MA_X \tag{2}$$

When the vehicle 1 is decelerating, namely when the acceleration $A_X$ is negative, it is assumed that equal braking forces are applied to the four wheels 10 by the brakes and consequently equal longitudinal forces act on the four wheels 10. That is, the relationship $F_{X,1}=F_{X,2}=F_{X,3}=F_{X,4}$ is assumed. Based on this relationship and Equation (1), the longitudinal forces $F_{X,1}$, $F_{X,2}$, $F_{X,3}$, and $F_{X,4}$ during deceleration of the vehicle 1 are expressed by Equation (3) below.

$$R_{X,1}=F_{X,2}=F_{X,3}=F_{X,4}=\tfrac{1}{4}MA_X \tag{3}$$

As described above, the longitudinal force estimator 41 uses different equations for estimation of the longitudinal forces $F_{X,i}$ depending on whether the vehicle 1 is accelerating or decelerating. Specifically, the longitudinal force estimator 41 uses Equation (2) during acceleration and Equation (3) during deceleration.

Estimation of Lateral Force

The way of estimating the lateral forces $F_{Y,i}$ will be described with reference to FIG. 5. FIG. 5 is a schematic plan view of the four-wheeled vehicle 1 for illustrating the concept of the lateral force estimation. The lateral force estimator 42 estimates the lateral forces $F_{Y,i}$ which are tire forces acting on the wheel 10 from the ground surface in the lateral direction. The lateral force estimator 42 performs this estimation based on the acceleration $A_Y$ of the vehicle body 2 in the lateral direction. The lateral force estimation of the present embodiment is based on the assumption that the acceleration $A_Y$ of the vehicle body 2 in the lateral direction is generated by the sum of the lateral forces $F_{Y,i}$ acting on the four wheels 10 from the ground surface in the lateral direction. In this case, a motion equation describing the motion of the vehicle body 2 in the lateral direction is given as Equation (4) below.

$$MA_Y=F_{Y,1}+F_{Y,2}+F_{Y,3}+F_{Y,4} \tag{4}$$

It is further assumed that equal lateral forces act on the four wheels 10. That is, the relationship $F_{Y,1}=F_{Y,2}=F_{Y,3}=F_{Y,4}$ is assumed. Based on this relationship and Equation (4), the lateral forces $F_{Y,1}$, $F_{Y,2}$, $F_{Y,3}$, and $F_{Y,4}$ are expressed by Equation (5) below.

$$F_{Y,1}=F_{Y,2}=F_{Y,3}=F_{Y,4}=1/4 MA_Y \tag{5}$$

Estimation of Vertical Force

The vertical force estimator 43 estimates the vertical forces $F_{Z,i}$ which are tire forces acting on the wheels 10 from the ground surface in the vertical direction. The vertical force estimator 43 performs this estimation based on the acceleration $A_X$ of the vehicle body 2 in the longitudinal direction, the acceleration $A_y$ of the vehicle body 2 in the lateral direction, the accelerations $a_i$ of the wheels 10 in the vertical direction, and the stroke amounts $u_i$ of the shock absorbers 22. Specifically, the vertical force estimator 43 estimates the vertical forces $F_{Z,i}$ according to Equation (6) below.

$$F_{Z,i}=N_i+\Delta F_{\alpha\_LPF,i}+\Delta F_{\beta\_LPF,i}+\Delta F_{\gamma,i} \tag{6}$$

In Equation (6), $N_i$ represents a vertical force acting on the wheel 10 from the ground surface when the vehicle is at rest. In the following description, the vertical force $N_i$ acting on the vehicle at rest may be referred to as a "base value". Where the vertical forces acting on the four wheels 10 of the vehicle at rest are not distinguished from one another, the vertical forces are denoted using a suffix letter "i"; namely, they are designated as "vertical force(s) $N_i$". Where the vertical forces which respectively act on the left front, right front, left rear, and right rear wheels 11, 12, 13, and 14 of the vehicle at rest are distinguished from one another, the four vertical forces are denoted by $N_1$, $N_2$, $N_3$, and $N_4$, respectively.

In Equation (6), $\Delta F_{\alpha\_LPF,i}$ represents a low-frequency component of a first vertical force change $\Delta F_{\alpha,i}$. The first vertical force change $\Delta F_{\alpha,i}$ is the amount of vertical force change which is estimated from a change over time in the state of motion of the vehicle body 2 in the longitudinal direction. Where the first vertical force changes associated with the four wheels 10 are not distinguished from one another, the first vertical force changes are denoted using a suffix letter "i"; namely, they are designated as "first vertical force change(s) $\Delta F_{\alpha,i}$". Where the first vertical force changes associated with the left front, right front, left rear, and right rear wheels 11, 12, 13, and 14 are distinguished from one another, the first vertical force changes are denoted by $\Delta F_{\alpha,1}$, $\Delta F_{\alpha,2}$, $\Delta F_{\alpha,3}$, and $\Delta F_{\alpha,4}$, respectively. The low-frequency component of the first vertical force change $\Delta F_{\alpha,i}$ is denoted by $\Delta F_{\alpha\_LPF,i}$.

In Equation (6), $\Delta F_{\beta\_LPF,i}$ represents a low-frequency component of a second vertical force change $\Delta F_{\beta,i}$. The second vertical force change $\Delta F_{\beta,i}$ is the amount of vertical force change which is estimated from a change over time in the state of motion of the vehicle body 2 in the lateral direction. Where the second vertical force changes associated with the four wheels 10 are not distinguished from one another, the second vertical force changes are denoted using a suffix letter "i"; namely, they are designated as "second vertical force change(s) $\Delta F_{\beta,i}$". Where the second vertical force changes associated with the left front, right front, left rear, and right rear wheels 11, 12, 13, and 14 are distinguished from one another, the second vertical force changes are denoted by $\Delta F_{\beta,1}$, $\Delta F_{\beta,2}$, $\Delta F_{\beta,3}$, and $\Delta F_{\beta,4}$, respectively. The low-frequency component of the second vertical force change $\Delta F_{\beta,i}$ is denoted by $\Delta F_{\beta\_LPF,i}$.

In Equation (6), $\Delta F_{\gamma,i}$ represents a third vertical force change. The third vertical force change $\Delta F_{\gamma,i}$ is the amount of vertical force change which is estimated from a change over time in the state of motion of the wheel 10 in the vertical direction. Where the third vertical force changes associated with the four wheels 10 are not distinguished from one another, the third vertical force changes are denoted using a suffix letter "i"; namely, they are designated as "third vertical force change(s) $\Delta F_{\gamma,i}$". Where the third vertical force changes associated with the left front, right front, left rear, and right rear wheels 11, 12, 13, and 14 are distinguished from one another, the third vertical force changes are denoted by $\Delta F_{\gamma,1}$, $\Delta F_{\gamma,2}$, $\Delta F_{\gamma,3}$, and $\Delta F_{\gamma,4}$, respectively.

As seen from the foregoing, the vertical force estimator 43 calculates amounts of variation from the base value $N_i$ which is the vertical force acting on the four-wheeled vehicle 1 at rest (the amounts of variation will hereinafter be referred to as "variation values"), and adds the variation values to the base value $N_i$ to determine the vertical force $F_{Z,i}$.

The variation values in Equation (6) will now be briefly described. When the vehicle 1 is traveling on a rough ground surface, the four wheels 10 move up and down while causing the under-shock absorber elements to pivot in concert with the wheels 10. The high-frequency components of the variations values of the vertical force $F_{Z,i}$ are substantially equal to raw values of vertical force changes estimated from the up-and-down motion of the wheels 10. During travel of the vehicle 1 on a rough ground surface, the entire vehicle body 2 rocks up and down. The low-frequency components of the variations values of the vertical force $F_{Z,i}$ consist predominantly of vertical force changes estimated from the up-and-down motion of the entire vehicle body 2. Thus, calculating the low-frequency components individually and adding them to the base value $N_i$ leads to accurate estimation of the tire forces.

As described in detail later, the low-frequency components of the vertical force changes estimated from the change over time in the state of motion of the vehicle body 2 are obtained, for example, by passing the vertical force changes through a low-pass filter. The term "high frequency" as used herein refers to a frequency in a frequency range within which the number of vibrations per unit time of the wheel 10 in the vertical direction is expected to fall when the vehicle 1 is traveling on a rough ground surface, and the term "low frequency" as used herein refers to a frequency below the high-frequency range. For example, the low frequency is a frequency of 10 Hz or lower, and the high frequency is a frequency higher than 10 Hz.

Among the variation values, those calculated from the accelerations of the vehicle body 2 in the horizontal directions are referred to as "first components of variation values", and that calculated from the acceleration of the wheel 10 in the vertical direction is referred to as a "second component of variation values". In the present example, the low-frequency component $\Delta F_{\alpha\_LPF,i}$ of the first vertical force change $\Delta F_{\alpha,i}$ and the low-frequency component $\Delta F_{\beta\_LPF,i}$ of the second vertical force change $\Delta F_{\beta,i}$ correspond to the first components of variation values, and the third vertical force change $\Delta F_{\gamma,i}$ corresponds to the second component of variation values.

Hereinafter, the vertical force $N_i$ acting on the vehicle at rest, the first vertical force change $\Delta F_{\alpha,i}$, the second vertical force change $\Delta F_{\beta,i}$, and the third vertical force change $\Delta F_{\gamma,i}$ will be described individually.

Vertical Force $N_i$ Acting on Vehicle at Rest

Figure 6:
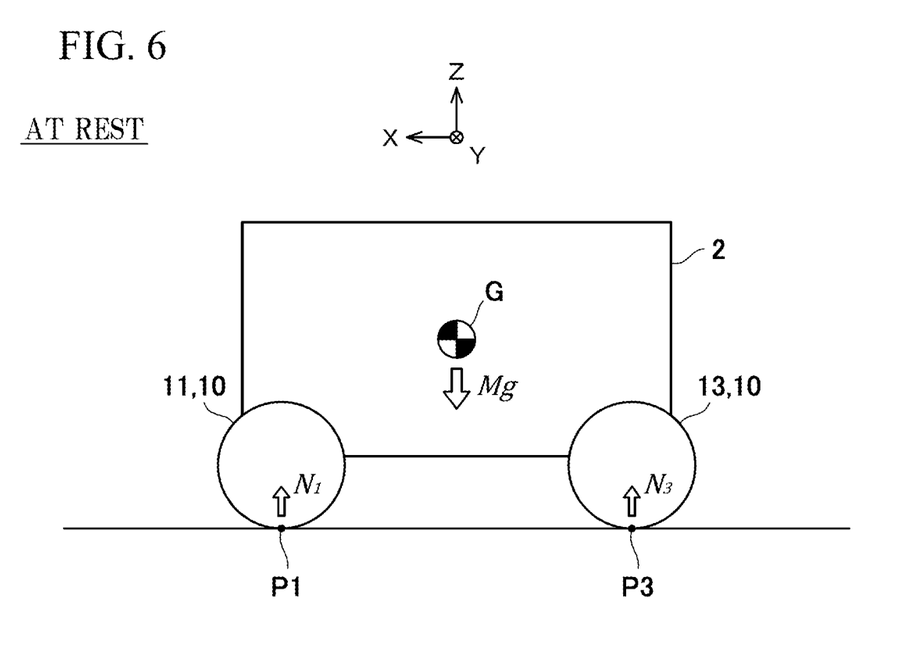
FIG. 6 is a schematic side view of the four-wheeled vehicle for illustrating a vertical force acting on the vehicle at rest.

The way of estimating the vertical force (base value) $N_i$ acting on the vehicle at rest will be described with reference to FIG. 6. FIG. 6 is a schematic side view of the four-wheeled vehicle for illustrating the vertical force $N_i$ acting on the vehicle at rest. As the weight of the vehicle body is supported by the four wheels 10, the equilibrium of forces in the vertical direction is expressed by Equation (7) below.

$$Mg = N_1 + N_2 + N_3 + N_4 \quad (7)$$

In this and subsequent equations, g represents the acceleration of gravity.

For example, when the four wheels 10 are equally distant from the center of gravity G both in the longitudinal direction and in the lateral direction, the four wheels 10 are subjected to equal vertical forces. In this case, the base values $N_1$, $N_2$, $N_3$, and $N_4$ are expressed by Equation (8) below.

$$N_i = \tfrac{1}{4} Mg \quad (8)$$

The base values $N_i$, $N_2$, $N_3$, and $N_4$ are pre-stored in the storage 43a. Equation (8) is an example of the means for deriving the base values $N_1$, $N_2$, $N_3$, and $N_4$. For example, the base values $N_1$ and $N_2$ associated with the front wheels 11 and 12 can be different from the base values $N_3$ and $N_4$ associated with the rear wheels 13 and 14 depending on the center of gravity G of the vehicle body 2. For example, the base values $N_1$, $N_2$, $N_3$, and $N_4$ may be values pre-measured using a measuring device. The base values $N_1$, $N_2$, $N_3$, and $N_4$ need not be pre-stored in the storage 43a. For example, a measuring device capable of measuring the load imposed on each wheel 10 may be mounted on the vehicle 1, and the processing unit 40 may calculate the base values $N_1$, $N_2$, $N_3$, and $N_4$ using the measurements obtained by the measuring device.

Estimation of First Vertical Force Change $\Delta F_{\alpha,i}$

Figure 7:
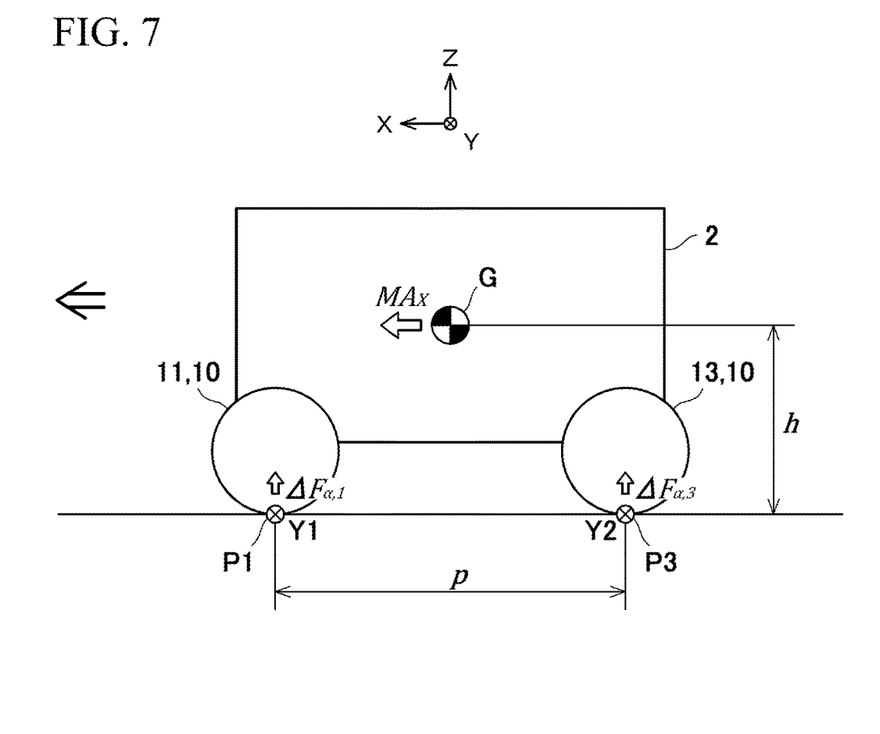
FIG. 7 is a schematic front view of the four-wheeled vehicle for illustrating the relationship between the acceleration of the vehicle body in a longitudinal direction and a first vertical force change.

The way of estimating the first vertical force change $\Delta F_{\alpha,i}$ will be described with reference to FIG. 7. FIG. 7 is a schematic side view of the four-wheeled vehicle for illustrating the relationship between the acceleration $A_x$ of the vehicle body 2 in the longitudinal direction and the first vertical force change $\Delta F_{\alpha,i}$. The first vertical force change calculator 43b estimates the first vertical force change $\alpha F_{\alpha,i}$ based on the acceleration $A_X$ of the vehicle body 2 in the longitudinal direction. The first vertical force change calculator 43b calculates a change in tire force resulting from pitching of the vehicle body 2 accelerating in the longitudinal direction. The calculated change is the first vertical force change $\Delta F_{\alpha,i}$.

The equilibrium of moments about the Y2 axis passing through the ground contact points P3 and P4 of the rear wheels 13 and 14 is expressed by Equation (9) below.

$$MA_X \cdot h = (\Delta F_{\alpha,1} + \Delta F_{\alpha,2}) \cdot p \quad (9)$$

Based on Equation (9), the first vertical force changes $\Delta F_{\alpha,1}$ and $\Delta F_{\alpha,2}$ associated with the left and right front wheels 11 and 12 are expressed by Equation (10) below.

$$\Delta F_{\alpha,1} = \Delta F_{\alpha,2} = \frac{h}{2p} M A_X \quad (10)$$

In this and subsequent equations, p represents the distance between the ground contact points P1 and P3 of the left front and rear wheels 11 and 13 and between the ground contact points P2 and P4 of the right front and rear wheels 12 and 14 in the longitudinal direction. The letter h represents the height from the ground contact surface of the wheels 10 to the center of gravity G.

The equilibrium of moments about the Y1 axis passing through the ground contact points P1 and P2 of the front wheels 11 and 12 is expressed by Equation (11) below.

$$MA_X \cdot h + (\Delta F_{\alpha,3} + \Delta F_{\alpha,4}) \cdot p = 0 \quad (11)$$

Based on Equation (11), the first vertical force changes $\Delta F_{\alpha,3}$ and $\Delta F_{\alpha,4}$ associated with the left and right rear wheels 13 and 14 are expressed by Equation (12) below.

$$\Delta F_{\alpha,3} = \Delta F_{\alpha,4} = -\frac{h}{2p} M A_X \quad (12)$$

The first vertical force change calculator 43b estimates the first vertical force changes $\Delta F_{\alpha,1}$, $\Delta F_{\alpha,2}$, $\Delta F_{\alpha,3}$, and $\Delta F_{\alpha,4}$ associated with the four wheels 10 according to Equations (10) and (12).

Estimation of Second Vertical Force Change $\Delta F_{\beta,i}$

Figure 8:
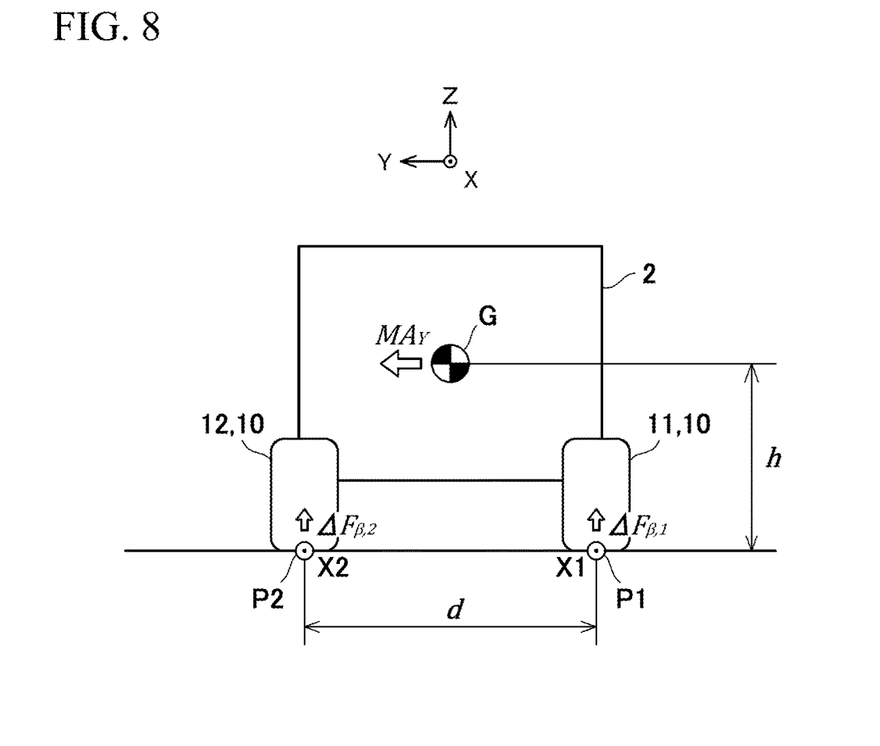
FIG. 8 is a schematic side view of the four-wheeled vehicle for illustrating the relationship between the acceleration of the vehicle body in a lateral direction and a second vertical force change.

The way of estimating the second vertical force change $\Delta F_{\beta,i}$ will be described with reference to FIG. 8. FIG. 8 is a schematic front view of the four-wheeled vehicle 1 for illustrating the relationship between the acceleration $A_Y$ of the vehicle body 2 in the lateral direction and the second vertical force change $\Delta F_{\beta,i}$. The second vertical force change calculator 43c estimates the second vertical force change $\Delta F_{\beta,i}$ based on the acceleration $A_Y$ of the vehicle body 2 in the lateral direction. The second vertical force change calculator 43c calculates a change in tire force resulting from rolling of the vehicle body 2 accelerating in the lateral direction. The calculated change is the second vertical force change $\Delta F_{\beta,i}$.

The equilibrium of moments about the X2 axis passing through the ground contact points P2 and P4 of the right wheels 12 and 14 is expressed by Equation (13) below.

$$MA_Y \cdot h + (\Delta F_{\beta,1} + \Delta F_{\beta,3}) \cdot d = 0 \tag{13}$$

In this and subsequent equations, d represents the distance between the ground contact points P1 and P2 of the left and right front wheels 11 and 12 and between the ground contact points P3 and P4 of the left and right rear wheels 13 and 14 in the lateral direction.

Based on Equation (13), the second vertical force changes $\Delta F_{\beta,i}$ and $\Delta F_{\beta,3}$ associated with the left front and rear wheels 11 and 13 are expressed by Equation (14) below.

$$\Delta F_{\beta,1} = \Delta F_{\beta,3} = -\frac{h}{2d} MA_Y \tag{14}$$

The equilibrium of moments about the X1 axis passing through the ground contact points P1 and P3 of the left wheels 11 and 13 is expressed by Equation (15) below.

$$MA_Y \cdot h = (\Delta F_{\beta,2} + \Delta F_{\beta,4}) \cdot d \tag{15}$$

Based on Equation (15), the second vertical force changes $\Delta F_{\beta,2}$ and $\Delta F_{\beta,4}$ associated with the right front and rear wheels 12 and 14 are expressed by Equation (16) below.

$$\Delta F_{\beta,2} = \Delta F_{\beta,4} = \frac{h}{2d} MA_Y \tag{16}$$

The first vertical force change calculator 43b estimates the second vertical force changes $\Delta F_{\beta,1}$, $\Delta F_{\beta,2}$, $\Delta F_{\beta,3}$, and $\Delta F_{\beta,4}$ associated with the four wheels 10 according to Equations (14) and (16).

Estimation of Third Vertical Force Change $\Delta F_{\gamma,i}$

Figure 9:
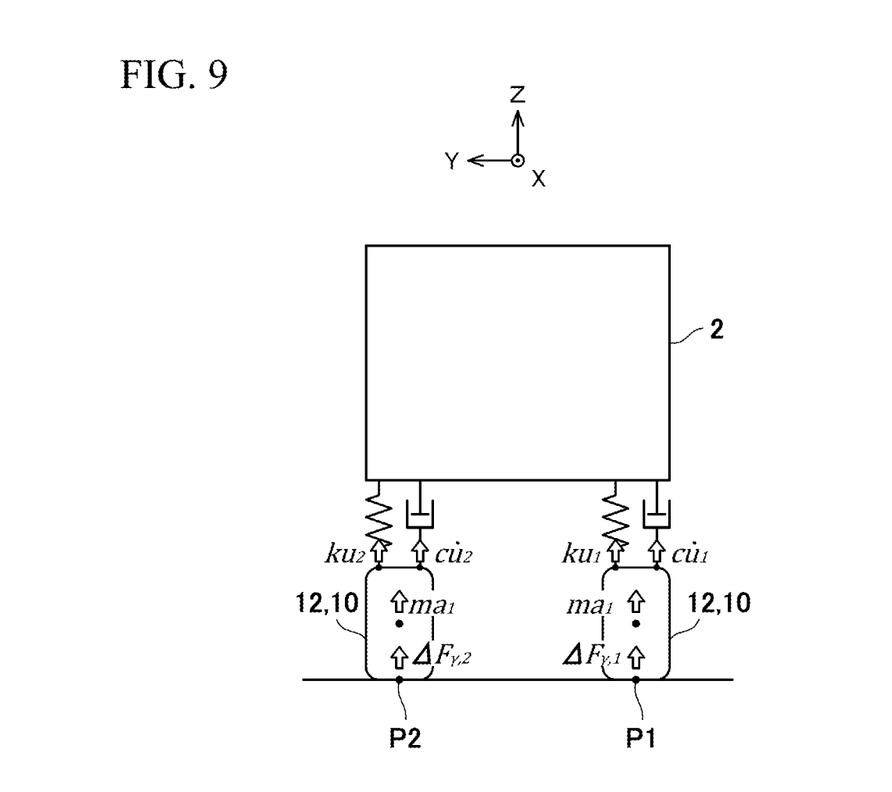
FIG. 9 is a schematic front view of the four-wheeled vehicle for illustrating the relationship between the wheel acceleration in a vertical direction and a third vertical force change.

The way of estimating the third vertical force change $\Delta F_{\gamma,i}$ will be described with reference to FIG. 9. FIG. 9 is a schematic side view of the four-wheeled vehicle 1 for illustrating the relationship between the acceleration $a_i$ of the wheel 10 in the vertical direction and the third vertical force change $\Delta F_{\gamma,i}$. The differentiator 43d calculates first-order time derivative values $u_1 \cdot$, $u_2 \cdot$, $u_3 \cdot$, and $u_4 \cdot$ of the stroke amounts $u_1$, $u_2$, $u_3$, and $u_4$ sent to the differentiator 43d. The third vertical force change calculator 43e estimates the third vertical force change $\Delta F_{\gamma,i}$ based on the acceleration $a_i$ of the wheel 10 in the vertical direction, the stroke amount $u_i$ of the shock absorber 22, and the first-order time derivative value $u_i$ of the stroke amount $u_i$.

A motion equation describing the motion of each wheel 10 in the vertical direction is given as Equation (17) below $$ma_i = \Delta F_{\gamma,i} + k u_i + c \dot{u}_i \tag{17}$$

In this and subsequent equations, m represents the weight of the lower part of the vehicle 1 which is below the shock absorber 22. For example, the weight represented by m may be the total weight of the wheel 10 and a part or all of the link 21. The letter k represents a spring constant of the shock absorber 22. The letter c represents a viscous damping coefficient of the shock absorber 22.

Based on Equation (17), the third vertical force change $\Delta F_{\gamma,i}$ is expressed by Equation (18) below.

$$\Delta F_{\gamma,i} = ma_i - (ku_i \dot{} c\dot{u}_i) \tag{18}$$

Extraction of Low-Frequency Component

The low-frequency component extractor 43f performs smoothing on the first and second vertical force changes $\Delta F_{\alpha,i}$ and $\Delta F_{\beta,i}$ calculated from the accelerations of the vehicle body 2 in the horizontal directions, and thereby calculates the low-frequency components $\Delta F_{\alpha\_LPF,i}$ and $\Delta F_{\beta\_LPF,i}$ of these changes.

The first and second vertical force change calculators 43b and 43c estimate the first and second vertical force changes $\Delta F_{\alpha,i}$ and $\Delta F_{\beta,i}$ at a series of time points and store the first and second vertical force changes $\Delta F_{\alpha,i}$ and $\Delta F_{\beta,i}$ estimated at each time point into the storage 43a. Thus, the time-series data of the first vertical force changes $\Delta F_{\alpha,i}$ and $\Delta F_{\beta,i}$ are stored in the storage 43a. The low-frequency component extractor 43f calculates the low-frequency components $\Delta F_{\alpha\_LPF,i}$ and $\Delta F_{\beta\_LPF,i}$ using the time-series data containing the first and second vertical force changes $\Delta F_{\alpha,i}$ and $\Delta F_{\beta,i}$ estimated during a predetermined period of time from a past time point to the present time point.

The above smoothing is a process for eliminating the influence of the motion of the wheel 10 from the estimated first vertical force changes $\Delta F_{\alpha,i}$ and $\Delta F_{\beta,i}$. In other words, the low-frequency component extractor 43f is configured to allow the estimated tire force to be less affected by the change in acceleration of the vehicle body 2 in the horizontal direction when the change per unit time in acceleration of the vehicle body 2 in the horizontal direction is above a predetermined level than when the change per unit time is below the predetermined level.

The smoothing will now be described in more detail. The up-and-down motion of the wheel 10 affects the state of motion of the vehicle body 2 connected to the wheel 10. As such, the first and second vertical force changes $\Delta F_{\alpha,i}$ and $\Delta F_{\beta,i}$, which are estimated from the change over time in the state of motion of the vehicle body 2, include the amounts of changes associated with the change over time in the up-and-down motion of the wheel 10. The changes associated with the change over time in the up-and-down motion of the wheel 10 overlap the third vertical force change $\Delta F_{\gamma,i}$ which is the amount of vertical force change estimated from the change over time in the state of motion of the wheel 10. Thus, if the first, second, and third vertical force changes $\Delta F_{\alpha,i}$, $\Delta F_{\beta,i}$, and $\Delta F_{\gamma,i}$ are merely added as the variation values to the base value $N_i$, then the accuracy of the vertical force estimation will deteriorate. In the present embodiment, the first and second vertical force changes $\Delta F_{\alpha,i}$ and $\Delta F_{\beta,i}$ are subjected to the smoothing to reduce the influence of impulse-like changes (or short-period changes) in the state of motion of the vehicle body 2 and prevent duplicate addition of the vertical force changes determined from the change over time in the state of motion of the wheel 10.

In the present example, the smoothing is low-pass filtering. The low-pass filtering removes components with frequencies higher than a predetermined cutoff frequency from each of the variation values, in particular the first and second vertical force changes $\Delta F_{\alpha,i}$ and $\Delta F_{\beta,i}$. The cutoff frequency is predetermined such that the influence of the up-and-down motion of the wheel 10 is eliminated. The cutoff frequency may be fixed or variable. For example, when the vehicle 1 is traveling on a rough ground surface (such as on a gravel road), the higher the travel speed of the vehicle 1, the shorter the period of the motion of the wheel 10 in the vertical direction. Thus, the low-frequency component extractor 43f may vary the cutoff frequency as a function of the travel speed of the vehicle 1.

The low-frequency component extractor 43f performs the low-pass filtering on the first vertical force change $\Delta F_{\alpha,i}$ estimated by the first vertical force change calculator 43b, and thereby extracts the low-frequency component $\Delta F_{\alpha\_LPF,i}$. The low-frequency component extractor 43f performs the low-pass filtering on the second vertical force change $\Delta F_{\beta,i}$ estimated by the second vertical force change calculator 43c, and thereby extracts the low-frequency component $\Delta F_{\beta\_LPF,i}$.

The adder 43g calculates the sum of the vertical force $N_i$ acting on the vehicle at rest, the low-frequency component $\Delta F_{\alpha\_LPF,i}$ of the first vertical force change $\Delta F_{\alpha,i}$, the low-frequency component $\Delta F_{\beta\_LPF,i}$ of the second vertical force change $\Delta F_{\beta,i}$, and the third vertical force change $\Delta F_{\gamma,i}$ according to Equation (6).

The processing unit 40 outputs the estimated longitudinal force $F_{X,i}$, lateral force $F_{Y,i}$, and vertical force $F_{Z,i}$ to an external device such as a vehicle controller, data recorder, or display. The estimated tire forces can be used for various purposes such as vehicle control, assistance for vehicle design development, and vehicle maintenance.

The tire forces estimated in the manner described above can be utilized for various purposes such as a vehicle control operation, vehicle development/design assist, and vehicle maintenance. In the depicted configuration of FIG. 1, for example, the processing unit 40 may be configured to perform a vehicle control operation based at least in part on the tire forces. In one example, the processing unit 40 may be configured to perform a vehicle control operation based at least in part on the vertical force $F_{Z,i}$.

The vehicle 1 may include a communicator that wirelessly transmits data on the estimated tire forces or at least the estimated vertical force $F_{Z,i}$ to a data server located outside the vehicle 1. The data server may be configured to communicate with a plurality of vehicles 1 and to receive and store data on tire forces estimated in the different vehicles 1. Turning to FIG. 2, the tire force estimator 100 may include such a data server and a processing unit other than the processing unit 40 (referred to as a "development support unit") that is configured to receive data on the tire forces of the vehicles 1 from the data server and analyze the received data to generate development support information for use in development of next-generation vehicles.

The tire force estimator 100 may include the data server and a processing unit other than the processing unit 40 and development support unit (referred to as a "maintenance unit") that is configured to receive data on the tire forces of the vehicles 1 from the data server and, based on the data, create maintenance information for assisting an entity performing maintenance tasks. The entity performing the maintenance tasks can be, for example, the owner of the vehicle 1 or a vehicle maintenance agency. The maintenance unit may process and convert the data stored in the data server into a form useful for the maintenance tasks, and the resulting information may be employed as the maintenance information. The maintenance information may be, for example, in the form of an accumulated value in a certain period of time or a list of values obtained at different time points. The maintenance information may include information indicating when the maintenance tasks for the vehicle 1 should be performed. The maintenance information may include information indicating which parts of the vehicle 1 require the maintenance tasks. The entity determines when and/or for which vehicle part they will perform the maintenance tasks with reference to the maintenance information output by the maintenance unit. The maintenance unit may convert the tire forces or vertical force stored in the data server to a given energy parameter. The energy parameter may be the amount of vehicle damage which can be derived by estimating the degree of deformation caused in the vehicle or part by the tire forces or vertical force. The maintenance unit may calculate the amount of accumulated damage to the vehicle or part by summing values of the energy parameter which are obtained at different time points or by substituting a value of the energy parameter into a given equation. The maintenance information output by the maintenance unit may include the amount of accumulated damage, and the maintenance unit may determine the time of maintenance based on the amount of accumulated damage.

Advantages

As described above, the tire force estimator 100 according to the present embodiment estimates the vertical force $F_{Z,i}$ acting on the wheel 10 from the ground surface in the vertical direction by using in combination the acceleration $a_i$ of the wheel 10 in the vertical direction and the accelerations of the vehicle body in the horizontal directions (the acceleration $A_X$ of the vehicle body 2 in the longitudinal direction and the accelerations $A_Y$ of the vehicle body 2 in the lateral direction in the present example). That is, the acceleration $a_i$ of the wheel 10 in the vertical direction is taken into account to estimate the tire force acting in the vertical direction. As such, the vertical force $F_{Z,i}$ acting in the vertical direction can be estimated more accurately than in conventional vertical force estimation which takes no account of the acceleration of the wheel 10 in the vertical direction. The tire force estimator 100 is especially beneficial, for example, for use in a four-wheeled vehicle such as the utility vehicle of the present embodiment in which the wheels undergo large up-and-down motion relative to the vehicle body.

In the present embodiment, the first acceleration sensor 31 for detecting the accelerations of the vehicle body 2 in the horizontal directions is mounted on the vehicle body 2, and the second acceleration sensor 32 for detecting the acceleration $a_i$ of the wheel 10 in the vertical direction is mounted on the wheel 10 itself or the under-shock absorber element movable in conjunction with the up-and-down motion of the wheel 10. This allows for highly accurate estimation of both the accelerations $A_X$ and $A_Y$ of the vehicle body 2 in the horizontal directions and the acceleration $a_i$ of the wheel 10 in the vertical direction.

In the present embodiment, the processing unit 40 calculates the first and second vertical force changes $\Delta F_{\alpha,i}$ and $\Delta F_{\beta,i}$ of the vertical force $F_{Z,i}$ based on the accelerations $A_X$ and $A_Y$ of the vehicle body 2 in the horizontal directions, calculates the third vertical force change $\Delta F_{\gamma,i}$ of the vertical force $F_{Z,i}$ based on the acceleration $a_1$ of the wheel 10 in the vertical direction, and determines the vertical force $F_{Z,i}$ based on the calculated first, second, and third vertical force changes $\Delta F_{\alpha,i}$, $\Delta F_{\beta,i}$, and $\Delta F_{\gamma,i}$. Thus, the calculation of the first components of the tire force from the accelerations $A_X$ and $A_Y$ of the vehicle body 2 and the calculation of the second component of the tire force from the acceleration $a_1$ of the wheel 10 are carried out separately. This leads to high accuracy of the tire force estimation.

In the present embodiment, the low-frequency component extractor 43f performs smoothing on the first and second vertical force changes $\Delta F_{\alpha,i}$ and $\Delta F_{\beta,i}$ to calculate the low-frequency components $\Delta F_{\alpha\_LPF,i}$ and $\Delta F_{\beta\_LPF,i}$ of the changes $\Delta F_{\alpha,i}$ and $\Delta F_{\beta,i}$. When, for example, the four-wheeled vehicle 1 is traveling on a rough ground surface, the vehicle body 2 is subjected to vibration caused by frequent up-and-down motion of the four wheels 10. The high-frequency components of the motion of the vehicle body 2 can be considered to reflect the motion of the four wheels 10 in the vertical direction. In the present embodiment, in which the tire force changes determined from the accelerations $A_X$ and $A_Y$ of the vehicle body 2 in the horizontal directions are subjected to the smoothing, the influence of the motion of the wheels 10 can be maximally eliminated from the vertical force changes which are based on the accelerations $A_X$ and $A_Y$ of the vehicle body 2 in the horizontal directions (the first and second vertical force changes $\Delta F_{\alpha,i}$ and $\Delta F_{\beta,i}$). This results in, for example, improved accuracy of the estimation of the variation values of the vertical force $F_{Z,i}$ calculated by adding the vertical force changes which are based on the accelerations $A_X$ and $A_Y$ of the vehicle body 2 in the horizontal directions and the vertical force change which is based on the acceleration $a_1$ of the wheel 10 in the vertical direction.

In the present embodiment, the smoothing is low-pass filtering. Thus, for example, if the low-pass filter used is set so as to remove components with frequencies close to that of the up-and-down vibration of the wheel 10, selective elimination of the influence of the motion of the wheel 10 from the first components which are based on the accelerations of the vehicle body 2 in the longitudinal and lateral directions can be more easily accomplished than with other smoothing techniques such as moving averaging. The low-frequency component extractor 43f may be implemented by the processor executing a low-pass filtering program or by a low-pass filter circuit.

In the present embodiment, the second component (third vertical force change $\Delta F_{\gamma,i}$) of the vertical force $F_{Z,i}$ is determined using not only the acceleration $a_1$ of the wheel 10 in the vertical direction but also the stroke amount $u_i$ of the suspension structure 20. This allows for highly accurate calculation of the second component of the vertical force $F_{Z,i}$ and results in further improved accuracy of the estimation of the tire force acting in the vertical direction. Additionally, the calculation of the second component of the vertical force $F_{Z,i}$ can easily be accomplished since the calculation is performed using a motion equation describing the motion of the wheel 10 in the vertical direction.

Other Embodiments

Many modifications and other embodiments of the present disclosure will be apparent to those skilled in the art from the foregoing description. Accordingly, the foregoing description is to be construed as illustrative only, and is provided for the purpose of teaching those skilled in the art the best mode for implementing the teachings of the present disclosure. The details of the structure and/or function may be varied substantially without departing from the scope of the disclosure.

The vehicle 1 may include a differential that permits the wheels 10 to rotate at different speeds. The vehicle 1 may be switchable between a differential locked state in which the wheels 10 are permitted to rotate at different speeds and a differential unlocked state in which the wheels 10 are prevented from rotating at different speeds. When the vehicle 1 is in the differential locked state, the longitudinal and lateral forces acting on one wheel 10 and those acting on another wheel 10 may be assumed to differ by an amount corresponding to the difference in rotational speed between the wheels 10.

The four-wheeled vehicle of the present disclosure may be a four-wheel-drive vehicle. The four-wheeled vehicle of the present disclosure may be switchable between a two-wheel-drive mode and a four-wheel-drive mode. In this case, the longitudinal force estimation for the vehicle 1 which is accelerating may be performed using Equation (5) instead of Equation (3). The present disclosure is applicable to four-wheeled vehicles other than rough terrain vehicles.

While in the above embodiment the four-wheeled vehicle illustrated is a utility vehicle, the present disclosure is applicable to four-wheeled vehicles other than utility vehicles. For example, the present disclosure may be applied to an automobile or a four-wheeled vehicle without any cargo bed. Examples of such a four-wheeled vehicle include a straddle four-wheeled rough terrain vehicle and a golf cart.

While in the above embodiment the method described is one in which the tire force estimation is automatically executed by the processing unit 40, tire force estimation which is not effected automatically by a computer but effected manually is also included in the scope of the present disclosure.

The equations given above are merely examples, and the equations may be modified taking into account other factors. While in the above embodiment the gravity is taken into account as an external force which can affect the tire force estimation, another external force may be taken into account. In this case, an external force term taking into account the other external force may be added to the equations, or a correction coefficient for allowing the estimation result to approximate an actual measurement result may be added to the equations. Examples of the other external force which may be taken into account include air resistance generated during travel, a forward-moving force produced by following wind and acting in the travel direction, and the influence of crosswind. The equations may be modified to take into account the slope and cant of the ground surface.

The locations, numbers, and configurations of the first and second acceleration sensors 31 and 32 are not limited to those described in the above embodiment. For example, the vehicle 1 need not include the four second acceleration sensors 32. For example, the second acceleration sensor 32 may be provided for one of the left and right front wheels 11 and 12, and the acceleration of the other front wheel in the vertical direction may be estimated from a measurement of the second acceleration sensor 32. The second acceleration sensor 32 may be provided for one of the left and right rear wheels 13 and 14, and the acceleration of the other rear wheel in the vertical direction may be estimated from a measurement of the second acceleration sensor 32. While in the above embodiment the tire forces acting on all the four wheels 10 are estimated, tire force estimation performed for at least one of the four wheels 10 is included in the scope of the present disclosure.

The first acceleration sensor 31 need not be an IMU. For example, the first acceleration sensor 31 may be constituted by two devices separate from each other, one of which is for measuring the acceleration $A_X$ of the vehicle body 2 in the longitudinal direction and the other of which is for measuring the acceleration $A_Y$ of the vehicle body 2 in the lateral direction.

The plurality of (e.g., four) second acceleration sensors 32 may be able to measure a physical quantity other than the acceleration in the vertical direction. The acceleration $A_X$ of the vehicle body 2 in the longitudinal direction and the acceleration $A_Y$ of the vehicle body 2 in the lateral direction may be detected from measurements of the plurality of (e.g., four) second acceleration sensors 32. In this case, the need for the first acceleration sensor 31 is eliminated.

While in the above embodiment the vertical, lateral, and longitudinal forces are estimated, estimation of at least the vertical force is included in the scope of the present disclosure.

While in the above embodiment the tire force estimator 100 is installed in the vehicle 1, the processing unit 40 of the tire force estimator 100 may be disposed outside the vehicle 1. In this case, the processing unit 40 may be an information processing unit such as a personal computer. The tire force estimator 100 may include, for example, a communicator that wirelessly transmits measurements of the measuring unit 30 to the processing unit 40 disposed outside the vehicle 1.

While in the above embodiment the second component (third vertical force change $\Delta F_{\gamma,i}$) of the vertical force $F_{Z,i}$ is calculated using not only the acceleration $a_i$ of the wheel 10 in the vertical direction but also the stroke amount of the suspension structure 20, the present disclosure is not limited to such calculation of the second component. For example, the acceleration $a_i$ of the wheel 10 in the vertical direction may be used alone for the calculation of the second component of the vertical force $F_{Z,i}$.

While in the above embodiment the smoothing described is low-pass filtering, any smoothing technique can be used which eliminates the influence of the motion of the wheel 10 from the first and second vertical force changes $\Delta F_{\alpha,i}$ and $\Delta F_{\beta,i}$. For example, moving averaging may be employed.

In the above embodiment, the third vertical force change $\Delta F_{\gamma,i}$ may be subjected to a process for eliminating the influence of the motion of the vehicle body 2. For example, the third vertical force change $\Delta F_{\gamma,i}$ may be subjected to bypass filtering.

The processing unit 40 need not include the low-frequency component extractor 43f. Without the low-frequency component extractor 43f, the first and second vertical force changes $\Delta F_{\alpha,i}$ and $\Delta F_{\beta,i}$ may be handled as the first components. The terms $\Delta F_{\alpha\_LPF,i}$ and $\Delta F_{\beta\_LPF,i}$ in Equation (6) may be replaced by $\Delta F_{\alpha,i}$ and $\Delta F_{\beta,i}$, respectively.

What is claimed is:

1. A tire force estimator comprising:
   a measuring unit configured to measure accelerations for a four-wheeled vehicle including four wheels, a vehicle body, and a suspension structure that connects at least one wheel of the four wheels to the vehicle body, the suspension structure including a shock absorber that mitigates shock applied to the at least one wheel, the accelerations including an acceleration of the vehicle body in a horizontal direction and an acceleration of the at least one wheel in a vertical direction, the measuring unit being further configured to measure a stroke amount of the shock absorber; and
   a processing unit configured to estimate a tire force acting on the at least one wheel from a ground surface in the vertical direction based on the acceleration of the vehicle body in the horizontal direction, the acceleration of the at least one wheel in the vertical direction, and the stroke amount.

2. The tire force estimator according to claim 1, wherein the acceleration of the vehicle body in the horizontal direction includes an acceleration of the vehicle body in a longitudinal direction and an acceleration of the vehicle body in a lateral direction.

3. The tire force estimator according to claim 2, wherein the processing unit is configured to calculate a change in the tire force and determine the tire force based on the calculated change, the change resulting from pitching of the vehicle body accelerating in the longitudinal direction.

4. The tire force estimator according to claim 2, wherein the processing unit is configured to calculate a change in the tire force and determine the tire force based on the calculated change, the change resulting from rolling of the vehicle body accelerating in the lateral direction.

5. The tire force estimator according to claim 1, wherein
   the suspension structure further includes an under-shock absorber element rockable together with the shock absorber, and
   the measuring unit includes a first acceleration sensor that measures the acceleration of the vehicle body in the horizontal direction and a second acceleration sensor that measures the acceleration of the wheel in the vertical direction, the first acceleration sensor being mounted on the vehicle body, the second acceleration sensor being mounted on the wheel or the under-shock absorber element.

6. The tire force estimator according to claim 1, wherein the processing unit is configured to:
   calculate a first component of the tire force based on the acceleration of the vehicle body in the horizontal direction;
   calculate a second component of the tire force based on the acceleration of the wheel in the vertical direction; and
   determine the tire force based on the calculated first and second components.

7. The tire force estimator according to claim 6, wherein the processing unit is configured to: calculate a change in the tire force based on the acceleration of the vehicle body in the horizontal direction; and perform smoothing on the calculated change to calculate the first component as a low-frequency component of the tire force.

8. The tire force estimator according to claim 7, wherein the smoothing is low-pass filtering.

9. The tire force estimator according to claim 6, wherein the processing unit is configured to calculate the second component of the tire force based on the acceleration of the wheel in the vertical direction and the stroke amount.

10. The tire force estimator according to claim 6, wherein the processing unit is configured to calculate the second component of the tire force using a motion equation describing motion of the wheel in the vertical direction.

11. The tire force estimator according to claim 1, wherein the processing unit is configured to allow the estimated tire force to be less affected by a change in the acceleration of the vehicle body in the horizontal direction when a change per unit time in the acceleration of the vehicle body in the horizontal direction is above a predetermined level than when the change per unit time in the acceleration of the vehicle body in the horizontal direction is below the predetermined level.

12. The tire force estimator according to claim 1, wherein
   the suspension structure is a first suspension structure including the shock absorber as a first shock absorber, the wheel connected to the vehicle body by the first suspension structure is a first wheel of the four wheels, the four-wheeled vehicle further includes a second suspension structure connecting a second wheel of the four wheels to the vehicle body,
the first and second wheels are arranged in a longitudinal direction,
the first suspension structure further includes a first under-shock absorber element rockable together with the first shock absorber,
the second suspension structure includes a second shock absorber that mitigates shock applied to the second wheel and a second under-shock absorber element rockable together with the second shock absorber,
the measuring unit includes a first acceleration sensor that measures the acceleration of the vehicle body in the horizontal direction and two second acceleration sensors that respectively measure the accelerations of the first and second wheels in the vertical direction, the first acceleration sensor being mounted on the vehicle body, each of the two second acceleration sensors being mounted on a corresponding one of the first and second wheels or a corresponding one of the first and second under-shock absorber elements, and
the processing unit is configured to estimate the tire force for each of the first and second wheels.

13. The tire force estimator according to claim 1, wherein the suspension structure is a first suspension structure including the shock absorber as a first shock absorber,
the wheel connected to the vehicle body by the first suspension structure is a first wheel of the four wheels,
the four-wheeled vehicle further includes a second suspension structure connecting a second wheel of the four wheels to the vehicle body,
the first and second wheels are arranged in a lateral direction,
the first suspension structure further includes a first under-shock absorber element rockable together with the first shock absorber,
the second suspension structure includes a second shock absorber that mitigates shock applied to the second wheel and a second under-shock absorber element rockable together with the second shock absorber,
the measuring unit includes a first acceleration sensor that measures the acceleration of the vehicle body in the horizontal direction and two second acceleration sensors that respectively measure the accelerations of the first and second wheels in the vertical direction, the first acceleration sensor being mounted on the vehicle body, each of the two second acceleration sensors being mounted on a corresponding one of the first and second wheels or a corresponding one of the first and second under-shock absorber elements, and
the processing unit is configured to estimate the tire force for each of the first and second wheels.

14. The tire force estimator according to claim 1, wherein the suspension structure is a first suspension structure including the shock absorber as a first shock absorber,
the wheel connected to the vehicle body by the first suspension structure is a first wheel of the four wheels,
the four-wheeled vehicle further includes:
  a second suspension structure connecting a second wheel of the four wheels to the vehicle body,
  a third suspension structure connecting a third wheel of the four wheels to the vehicle body,
  a fourth suspension structure connecting a fourth wheel of the four wheels to the vehicle body,
the first suspension structure further includes a first under-shock absorber element rockable together with the first shock absorber,
the second suspension structure includes a second shock absorber that mitigates shock applied to the second wheel and a second under-shock absorber element rockable together with the second shock absorber,
the third suspension structure includes a third shock absorber that mitigates shock applied to the third wheel and a third under-shock absorber element rockable together with the third shock absorber,
the fourth suspension structure includes a fourth shock absorber that mitigates shock applied to the fourth wheel and a fourth under-shock absorber element rockable together with the fourth shock absorber,
the measuring unit includes a first acceleration sensor that measures the acceleration of the vehicle body in the horizontal direction and four second acceleration sensors that respectively measure the accelerations of the first, second, third, and fourth wheels in the vertical direction, the first acceleration sensor being mounted on the vehicle body, each of the four second acceleration sensors being mounted on a corresponding one of the first, second, third, and fourth wheels or a corresponding one of the first, second, third, and fourth under-shock absorber elements, and
the processing unit is configured to estimate the tire force for each of the first, second, third, and fourth wheels.

15. The tire force estimator according to claim 1, wherein the processing unit is configured to further estimate a tire force acting on the wheel from the ground surface in the horizontal direction based on the acceleration of the vehicle body in the horizontal direction.

16. A four-wheeled vehicle comprising:
a wheel;
a vehicle body supported by the wheel;
a suspension structure connecting the wheel to the vehicle body and including a shock absorber that mitigates shock applied to the wheel; and
a tire force estimator configured to estimate a tire force acting on the wheel from a ground surface in a vertical direction,
the tire force estimator including:
  a measuring unit configured to measure an acceleration of the vehicle body in a horizontal direction, an acceleration of the wheel in the vertical direction, and a stroke amount of the shock absorber; and
  a processing unit configured to estimate the tire force acting on the wheel from the ground surface in the vertical direction based on the acceleration of the vehicle body in the horizontal direction, the acceleration of the wheel in the vertical direction, and the stroke amount.

17. A tire force estimation method comprising:
measuring accelerations for a four-wheeled vehicle including a wheel, a vehicle body, and a suspension structure that connects the wheel to the vehicle body, the suspension structure including a shock absorber that mitigates shock applied to the wheel, the accelerations including an acceleration of the vehicle body in a horizontal direction and an acceleration of the wheel in a vertical direction;
measuring a stroke amount of the shock absorber; and
estimating a tire force acting on the wheel from a ground surface in the vertical direction based on the acceleration of the vehicle body in the horizontal direction, the acceleration of the wheel in the vertical direction, and the stroke amount.

\* \* \* \* \*